(12) United States Patent
Riel

(10) Patent No.: US 9,836,402 B1
(45) Date of Patent: Dec. 5, 2017

(54) GUEST ORDERING OF HOST FILE SYSTEM WRITES

(71) Applicant: Red Hat, Inc., Raleigh, NC (US)

(72) Inventor: Henri Van Riel, Merrimack, NH (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/216,826

(22) Filed: Jul. 22, 2016

(51) Int. Cl.
  *G06F 12/0868* (2016.01)
  *G06F 12/084* (2016.01)
  *G06F 9/455* (2006.01)

(52) U.S. Cl.
  CPC ...... *G06F 12/0868* (2013.01); *G06F 9/45558* (2013.01); *G06F 12/084* (2013.01); *G06F 2009/45583* (2013.01); *G06F 2212/1032* (2013.01); *G06F 2212/151* (2013.01); *G06F 2212/21* (2013.01); *G06F 2212/281* (2013.01)

(58) Field of Classification Search
  CPC ......... G06F 9/45558; G06F 2212/1032; G06F 2212/151; G06F 2212/21; G06F 2212/281; G06F 12/084; G06F 12/0868
  USPC ....................................................... 711/113
  See application file for complete search history.

(56) References Cited

U.S. PATENT DOCUMENTS

| | | | |
|---|---|---|---|
| 6,606,685 B2 | 8/2003 | Huxoll | |
| 7,167,960 B2 | 1/2007 | Kodama et al. | |
| 7,506,095 B2 | 3/2009 | Otte et al. | |
| 7,565,498 B1 | 7/2009 | Baird et al. | |
| 8,046,550 B2 * | 10/2011 | Feathergill | G06F 11/1466 711/162 |
| 8,065,687 B2 * | 11/2011 | Purtell, II | G06F 9/45558 718/1 |
| 8,527,673 B2 | 9/2013 | Mahalingam et al. | |
| 8,661,213 B2 * | 2/2014 | Scales | G06F 9/45558 707/639 |
| 9,081,599 B2 * | 7/2015 | Tsirkin | G06F 9/48 |
| 9,256,552 B2 | 2/2016 | Epstein | |
| 2005/0246453 A1 | 11/2005 | Erlingsson et al. | |

(Continued)

OTHER PUBLICATIONS

Mashtizadeh, A., Cai, M., Tarasuk-Levin, G., Koller, R., Garfinkel, T., Setty, S., "XvMotion: Unified Virtual Machine Migration over Long Distance", Proceedings of USENIX ATC '14, Jun. 2014.*

(Continued)

*Primary Examiner* — Reginald Bragdon
*Assistant Examiner* — Aaron D Ho
(74) *Attorney, Agent, or Firm* — Lowenstein Sandler LLP

(57) ABSTRACT

Systems and methods for data storage management technology that enables a guest module of a virtual machine to indicate an order in which a host module should write data from physical memory to a secondary storage. An example method may comprise: identifying, by a processing device executing a host module, a plurality of modifications to physical memory made by a plurality of direct access operations executed by a guest module of a virtual machine; determining, by the host module, an order of the plurality of modifications to physical memory; receiving, by the host module, a synchronization request from the guest module; and responsive to the synchronization request, copying, by the host module, data from the physical memory to a secondary storage in view of the order of the plurality of modifications.

20 Claims, 6 Drawing Sheets

(56) References Cited

U.S. PATENT DOCUMENTS

| | | | | |
|---|---|---|---|---|
| 2012/0210066 | A1* | 8/2012 | Joshi | G06F 12/0866 711/118 |
| 2016/0077972 | A1* | 3/2016 | Pease | G06F 12/0891 711/141 |
| 2016/0085837 | A1* | 3/2016 | Kotagiri | G06F 17/30575 707/634 |

OTHER PUBLICATIONS

Liu, J., Huang, W., Abali, B., Panda, D., "High performance VMM-bypass I/O in virtual machines", Proceedings of USENIX ATEC '06, 2006.*

Huang, W., Liu, J., Abali, B., and Panda, D., "A case for high performance computing with virtual machines", 2006, in Proceedings of the 20th annual international conference on Supercomputing, Cairns, Queensland, Australia.*

Smith, R., "Difference between Run Asynchronous command and Run Synchronous command", Aug. 2010, hosted by Microsoft Developer Network, retrieved from <https://social.msdn.microsoft.com/Forums/en-US/341f2f23-e85f-4706-9fc0-7f586be1fc84/difference-between-run-asynchronous-command-and-run-synchronous-command?forum=quebectools>.*

Huang, W., Liu, J., Koop, M., Abali, B., and Panda, D., "Nomad: migrating OS-bypass networks in virtual machines", Jun. 13-15, 2007, Proceedings of the 3rd international conference on Virtual execution environments, San Diego, California, USA.*

William K. Josephson, "A Direct-Access File System for a New Generation of Flash Memory", Princeton University, Apr. 2011, 135 pages, ftp://ftp.cs.princeton.edu/reports/2011/893.pdf.

Hari Volos, Sanketh Nalli, Sankarlingam Panneerselvam, Venkatanathan Varadarajan, Prashant Saxena and Michael M. Swift, "Aerie: Flexible File-System Interfaces to Storage-Class Memory" HP Labs, Palo Alto; University of Wisconsin—Madison, Apr. 13-16, 2014, 14 pages, http://pages.cs.wisc.edu/~swift/papers/eurosys14-aerie.pdf.

Jake Edge, "Persistent Memory", Mar. 26, 2014, 4 pages, https://lwn.net/Articles/591779/.

Walt Hubis, "Developments in the NVM Programming Model", SNIA, Jan. 20, 2015, 28 pages.

Matthew Wilcox, "Support ext4 on NV-DIMMs", Feb. 25, 2014, 4 pages, https://lwn.net/Articles/588218/.

Matthew Wilcox, "DAX: Page cache bypass for filesystems on memory storage", Oct. 24, 2014, 4 pages, https://lwn.net/Articles/618064/.

Mohit Saxena, Pin Zhou and David Pease, "vDrive: An Efficient and Consistent Virtual I/O System", IBM Research Almaden, Datos IO, 13 pages, Oct. 2015, http://pages.cs.wisc.edu/~msaxena/new/papers/vDrive-trios15.pdf.

Snia, "Linux NVDIMM Software Architecture", 1 page, Jan. 20, 2016, http://ww3.sinaimg.cn/large/715142afgw1f0ittvtravj20ye0pgqaa.jpg.

* cited by examiner

GUEST ORDERING OF HOST FILE SYSTEM WRITES

TECHNICAL FIELD

The present disclosure is generally related to data storage management, and is more specifically related to managing memory modifications in a virtualized environment.

BACKGROUND

The virtualization of a data center results in a physical system being virtualized using virtual machines to consolidate the data center infrastructure and increase operational efficiencies. A virtual machine (VM) may be an emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
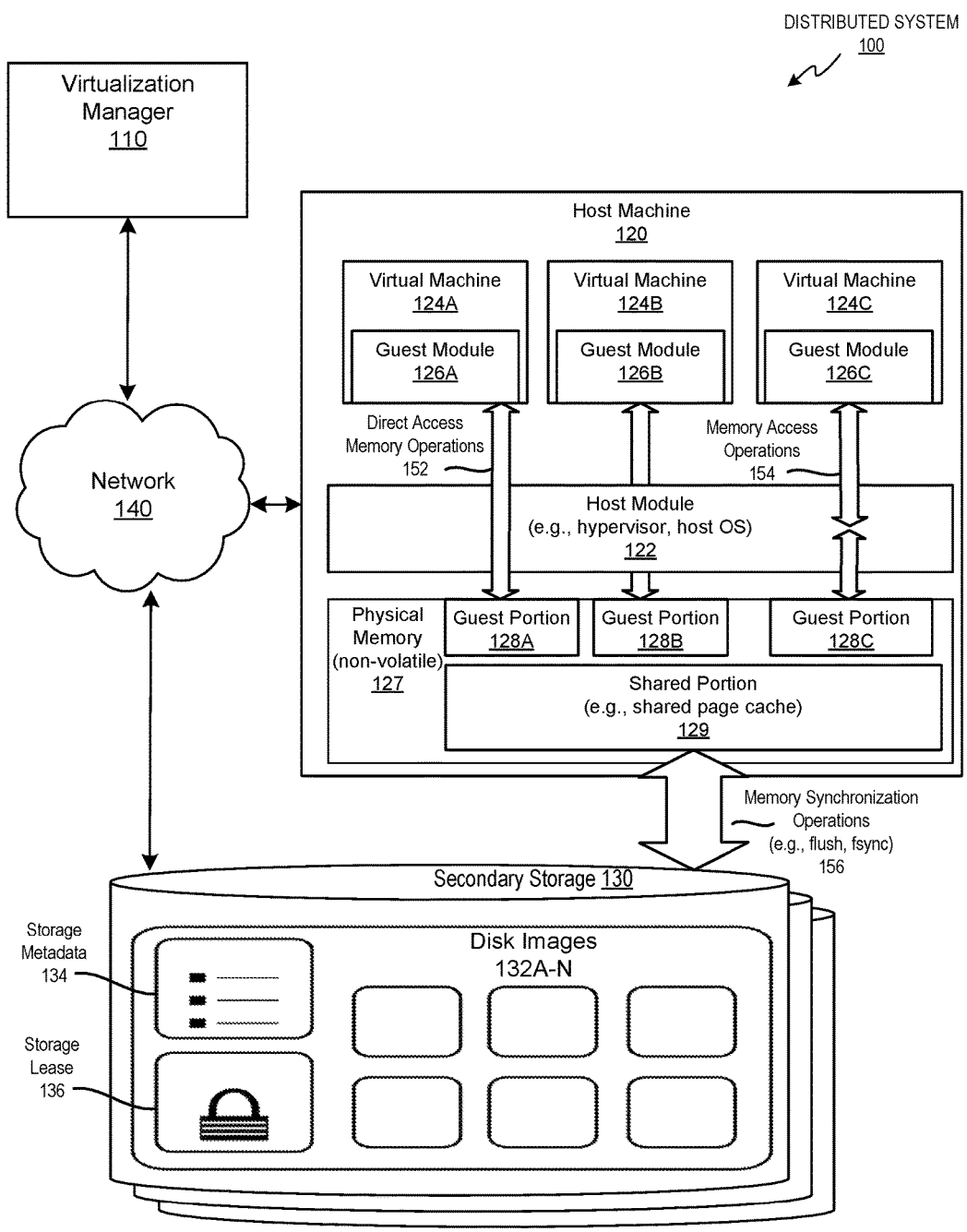
FIG. 1 depicts a high-level diagram of an example distributed system operating in accordance with one or more aspects of the present disclosure.

Described herein are methods and systems for data storage management technology that enables a guest module of a virtual machine to indicate an order in which a host module should write data from memory to a secondary storage (e.g., disk). Many traditional virtualized computing environments include a host (e.g., hypervisor) that shares physical memory with one or more virtual machines. Each virtual machine may include a guest operating system that manages the memory associated with the virtual machine. Each of the virtual machines running on the host machine may be associated with a disk image that is loaded into physical memory and stored on a secondary storage. Each of the guest operating systems may include a page cache (e.g., disk cache) for reading and writing to the disk image via the hypervisor. In a traditional virtualization environment, the disk image may be loaded into physical memory from a read-only copy in secondary storage and a new copy of the disk image may be occasionally created to reflect changes to the disk image in physical memory. A problem may arise if a failure occurs after the disk image has been changed in physical memory but prior to a new disk image being created. The failure may be any computer system failure and may include power failures, hardware failures, operating system failures, network failures, storage failures, other failures, or a combination thereof and may result in problems such as data loss, data corruption, data inconsistencies, other problems, or a combination thereof.

Aspects of the present disclosure address the above and other deficiencies. In one example, a host machine may include non-volatile physical memory that is accessible to a host module (e.g., hypervisor) and one or more guest modules (e.g., guest operating systems). The guest modules may access the physical memory using direct access operations that enable the guest module to modify the physical memory without involving the host module. In one example, the guest module may store a guest file system in non-volatile physical memory and make modifications to the guest file system without interacting with the host module. While enabling the guest module to write directly to the physical memory, aspects of the present disclosure may also assist the host module in detecting an order of writes and in safely synchronizing the data in physical memory with the data on secondary storage. In one example, the guest module and host module may interact with one another so that the guest module can indicate an order of file system writes and signal when data from the physical memory can be synchronized to the secondary storage. For example, the guest module may make a synchronization request (e.g., issue a hypercall) to the host module and the synchronization request may provide information to identify one or more portions of data and an order the one or more portions of data should be written to secondary storage.

Accordingly, aspects of the present disclosure may reduce the amount of memory, processing power, and secondary storage consumed by virtual machines and enable a single host machine to support more virtual machines. The disclosed technology may reduce the memory consumed by the virtual machines by enabling the virtual machine to write directly to a guest file system in memory and therefore may avoid having a page cache stored by the virtual machine. The disclosed technology may also reduce the processing power consumed by the virtual machines by remove the overhead incurred by the hypervisor when mediating the virtual machine modifications of the physical memory. The secondary storage consumed by the virtual machines may be reduced by enabling a disk image in secondary storage to remain modifiable using the disclosed synchronization, and therefore reducing the creation of multiple read-only copies of the disk image. In another example, the disclosed write ordering and synchronization technique may be used to create copies (e.g., snapshots) of the physical memory. These and other advantages may be apparent in view of the technology disclosed herein. Various aspects of the above referenced methods and systems are described in details herein below by way of examples, rather than by way of limitation.

FIG. 1 illustrates an example distributed system 100 in which implementations of the disclosure may operate. The distributed system 100 may include a virtualization manager 110, a host machine 120, and a secondary storage 130 coupled via a network 140. The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Virtualization manager 110 may be hosted by a computer system and include one or more computer programs executed by the computer system for centralized management of the distributed system 100. In one implementation, the virtualization manager 110 may comprise various interfaces, including administrative interface, reporting interface, and/or application programming interface (API) to communicate with host machine 120, as well as to user portals, databases, directory servers and various other components, which are omitted from FIG. 1 for clarity.

Host machine 120 may comprise one or more processors communicatively coupled to physical memory devices and input/output (110) devices, as described in more details herein below with references to FIGS. 2, 5, and 6. Host machine 120 may run a host module 122 that provides computing resources to a plurality of virtual machines 124A-C. Host module 122 may be any program or combination of programs including a hypervisor, host operating system, or a combination thereof. Host module 122 may manage and monitor various aspects of the operation of host machine 120, including the storage, memory and network interfaces. Host module 122 may abstract the physical layer features such as processors, memory, and I/O devices, and present this abstraction as virtual devices to virtual machines 124A-C running guest modules 126A-C.

Each of the guest modules 126A-C may be a program or combination of programs that is capable of using the virtual devices provided by host module 122 to perform computing tasks. In one example, guest module 126 may be a guest operating system that includes one or more kernel space programs (e.g., drivers) and one or more user space programs (e.g., applications). In another example, the guest module 126 may be a user space program (e.g., application) that is running on a guest operating system. In either example, guest module 126 may support direct access memory operations 152 using one or more instructions, functions, libraries or combination thereof.

Direct access memory operations 152 may enable a guest module (e.g., 126A) to modify physical memory 127 without interacting with host module 122. Direct memory access 152 may be contrasted to memory access 154, which may use multiple calls across multiple virtualization layers to make a change to physical memory 127. For example, guest module 126C may utilize memory access 154 by making a first memory call (e.g., system call) to an underlying guest operating system and the guest operating system may make a second memory call (e.g., hypercall) to host module 122. Host module 122 may then make a third memory call (e.g., hardware specific load instruction) to modify physical memory 127. Direct memory access 152 may enable guest module 126 to modify physical memory without using intermediate memory calls (e.g., second and third memory calls) that exist at intermediate virtualization layers. Direct access memory operations 152 are discussed in more detail below, in regards to direct access module 212 of FIG. 2 and may be advantageous because they may enable a user space program running on a guest operating system to bypass both the underlying guest operating system and the host module 122 (e.g., hypervisor and host OS) when modifying physical memory 127.

Physical memory 127 may be any physical storage device that is capable of storing data. In one example, physical memory 127 may include non-volatile data storage such as non-volatile memory (NVM). Non-volatile memory may be computing memory that can provide stored information after being power cycled (e.g., turned off and back on). In one example, physical memory 127 may include direct access memory, which may be also known as DAX memory (e.g., Direct Access eXcited memory), which may be non-volatile memory that provides load and store instructions that can be accessed by user space programs without making a system call to an underlying kernel. In another example, physical memory 127 may include volatile memory that emulates non-volatile memory. Host machine 120 may emulate non-volatile memory with volatile memory by persisting the data in the volatile memory to a data structure (e.g., file) on persistent data storage (e.g., secondary storage 130). This may enable physical memory 127 to appear to guest module 126A as non-volatile memory because it may provide access speeds similar to non-volatile memory and provide access to the data after a power cycle.

In the example, shown in FIG. 1, physical memory 127 may include guest portions 128A-C and a shared portion 129. Each guest portion 128A-C may be a physical or logical portion of memory that is designated by the host module for use with a particular virtual machine (e.g., 124A-C). Shared portion 129 may be a portion of the physical machine that stores a shared buffer (e.g., shared page cache, shared disk cache). The shared buffer may be managed by host module 122 and may include data that is shared across the one or more virtual machines 124A-C. Storing a shared buffer (e.g., shared page cache) in shared portion 129 may be more beneficial then storing individual buffers in each of the guest portions 128A-C. This is because the individual buffers stored in guest portions 128A-C may include the same or similar information and may occupy large portions of memory dedicated to the guest modules 999. Providing a shared buffer and enabling the guest modules 126-A-C to use the shared buffer may reduce the amount of memory occupied by the guest module 126A-C and enable host module to support more guest modules with the same amount of memory resources.

In one example, the shared buffer may include data that is common to multiple virtual machines, such as, common data structures (e.g., files), common libraries (e.g., shared objects (SO), dynamic link libraries (DLLs)), common configurations (e.g., settings), other information, or a combination thereof. The common data may be provided as read-only or may be modifiable by one or more of the virtual machines 124A-C. When the data in physical memory 127 is modified, the host module 122 or guest module 126 may initiate a memory synchronization operation 156 to synchronize the modified data (e.g., dirty pages) with the corresponding data in secondary storage 130.

Secondary storage 130 may include any physical storage device that is capable of storing data and providing shared access to data storage space by one or more host machines. Secondary storage 130 may include block-based storage devices, file-based storage devices, or a combination thereof. Block-based storage devices may include one or more data storage devices (e.g., Storage Area Network (SAN) devices) and provide access to consolidated block-based (e.g., block-level) data storage. Block-based storage devices may be accessible over a network and may appear to an operating system of a host machine as locally attached storage. File-based storage devices may include one or more data storage devices (e.g., Network Attached Storage (NAS) devices) and provide access to consolidated file-based (e.g., file-level) data storage that may be accessible over a network.

As shown in FIG. 1, secondary storage 130 may include disk images 132A-N, storage metadata 134, and storage lease 136. In one example, secondary storage 130 may employ block-based storage and disk images 132A-N, storage metadata 134, and storage lease 136 may be provided by respective logical volumes. In another example, secondary storage 130 may employ file-based storage and disk images 132A-N, storage metadata 134, and storage lease 136 may be provided by one or more respective files.

Disk images 132A-N (also referred to as a virtual disk image) may comprise one or more volumes for storing disk image data. Each disk image may represent a chain of volumes comprising one or more copy-on-write (COW) volumes (which may also be referred to as "layers"). From the perspective of one of the virtual machines 124A-C, these volumes may appear as a single disk image, as host module 122 presents the virtual disk to a virtual machine and implements the associated disk read-write operations. Initially, a virtual machine disk image may comprise one raw or COW volume, which may be made read-only before the first boot of the virtual machine. An attempt to write to a disk by a virtual machine may modify the disk image or may trigger adding a new COW volume ("layer") to the volume chain. The newly created volume may be made writable, and may store disk blocks or files that have been modified or newly created by the virtual machine after the previous volume ("layer") has been made read-only. One or more volumes may be added to the volume chain during the lifetime of the virtual machine. In some implementations, making the previous volume read-only (e.g., responsive to receiving a command via an administrative interface) triggers adding of a new COW volume. The virtual disk device implemented by the hypervisor locates the data by accessing, transparently to the virtual machine, each volume of the chain of volumes, starting from the most recently added volume.

Each of the disk images 132A-N may store and organize information that may be loaded onto a machine (e.g., virtual machine or physical machine) and may be executed by the machine to provide a computing service. In one example, a disk image may be generated by creating a sector-by-sector copy of a source medium (e.g., hard drive of example machine). In another example, a disk image may be generated based on an existing disk image and may be manipulated before, during, or after being loaded and executed. The format of the disk images 132A-N may be based on any open standard, such as the ISO image format for optical disc images, or based on a proprietary format. Each disk image 132A-N may be associated with one or more computer programs (e.g., operating systems, applications) and configuration information (e.g., configuration files, registry keys, state information). The configuration information may include state information that indicates the state of one or more running programs at a point in time or over a duration of time. Each state may be the same or similar to a snapshot of the machine at a particular point in time or over a duration of time. In one example, the snapshot may store the state of a machine in a manner that enables it to be portable to other computing devices, so that when the other computing devices loads the snapshot it may function as if it were running on the original device.

Storage metadata 134 of secondary storage 130 may be employed for storing references to associated volumes (e.g., to parent or child volumes in a copy-on-write chain) and/or other information that may be utilized for volume identification, management, creation, modification, removal, and/or for performing data modification operations (e.g., file operations) with respect to the data stored on the volumes in the secondary storage 130.

Storage lease 136 of the secondary storages 130 may be employed for storing the information that may be utilized for managing access to the volumes in the secondary storage 130. In certain implementations, secondary storages 130 may provide a centralized locking facility (e.g., lease manager) to prevent conflicting access by multiple host machines. By obtaining a lease from the lease manager with respect to the secondary storage 130, a host machine may receive exclusive access to a portion of secondary storage that would prevent other hosts from accessing the portion while the lease is active. A lease may have a certain expiration period and may be extended by the requestor. Failure to timely extend a lease may lead to the expiration of the lease. The state of the current lease with respect to a given secondary storage may be stored in the lease area 136 of the secondary storage.

Figure 2:
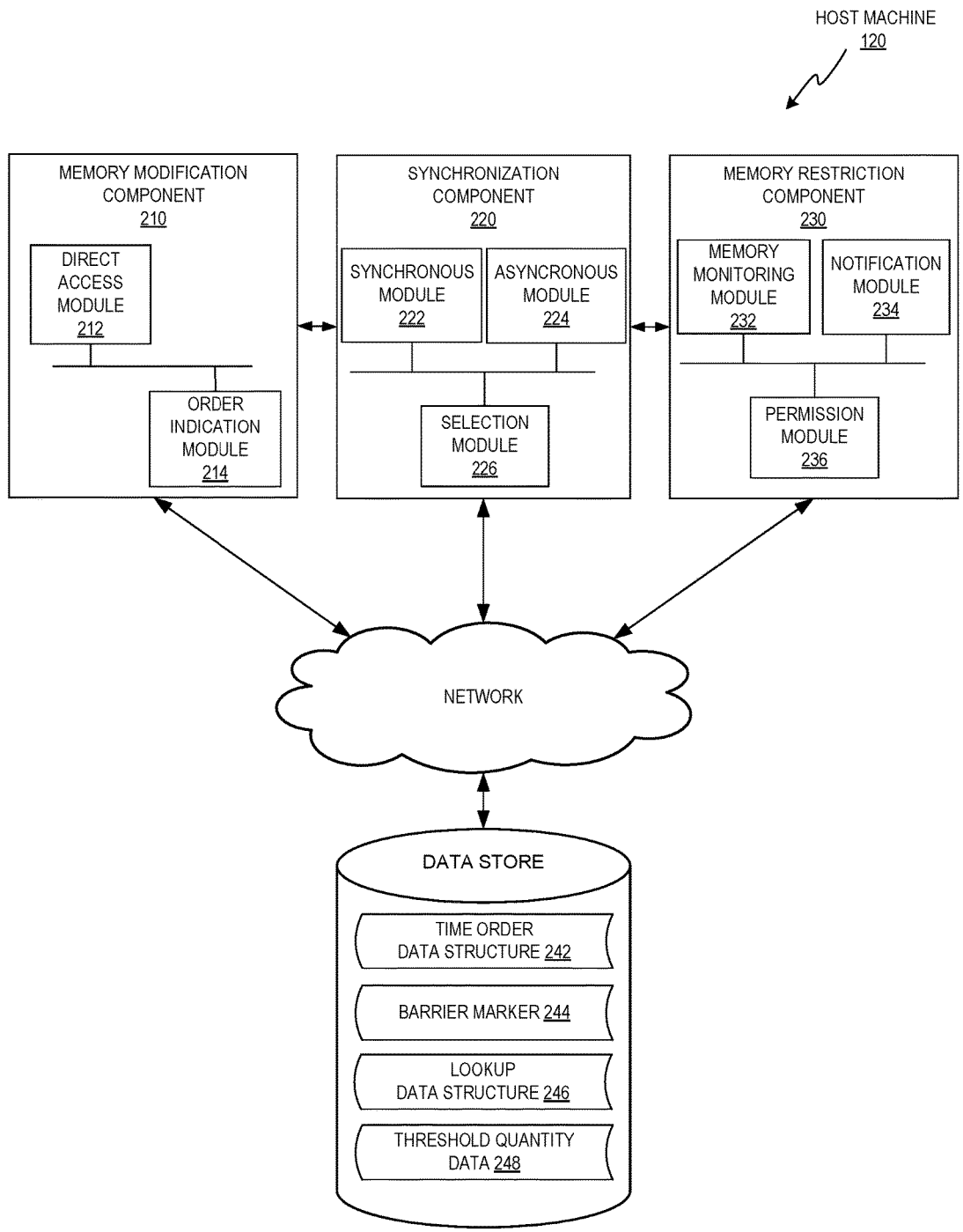
FIG. 2 depicts a high-level diagram of an example host machine operating in accordance with one or more aspects of the present disclosure.

FIG. 2 is a block diagram illustrating components and modules of an exemplary host machine 120, in accordance with one or more aspects of the present disclosure. In the example shown, host machine 120 may include a memory modification component 210, a synchronization component 220, and a memory restriction component 230. More or less components may be included without loss of generality. For example, two or more of the modules may be combined into a single module, or one of the modules may be divided into two or more modules. In one implementation, one or more of the modules may reside on different computing devices (e.g., different host machines, on a single client device, distributed among multiple client devices, etc.).

Memory modification component 210 may include functionality for making and tracking modifications to the physical memory. In one example, memory modification component 210 may include a direct access module 212 and an order indication module 214.

Direct access module 212 may provide support for direct access operations that enable a guest module to access and modify physical memory without interacting with the host module. Direct access module 212 may include features, functions, libraries or other instructions that are a part of the guest module (e.g., user program, guest operating system), the host module (e.g., hypervisor, host operating system), or a combination thereof. In one example, a direct access operation may be initiated by a guest module by making a memory call (e.g., function call) that bypasses the host module and initiates a firmware or hardware based memory instruction of the physical memory (e.g., load or store instruction). Direct access memory operations 152 may utilize the same central processing unit (CPU) executing the guest module or host module and may therefore be different then direct memory access (DMA). Direct memory access may be different from direct access memory because direct memory access (DMA) is a hardware feature that enables a hardware subsystem (e.g., graphics card, network card) to modify physical memory without interacting with any central processing unit (CPU), whereas direct access memory may use a CPU but bypass any or all of the computing processes associated with the host module.

Direct access module 212 may include an intercept mechanism that enables the direct access module 212 to intercept direct access memory operations made by a guest module before, during, or after the direct access memory operation is executed. The intercept mechanism may be used to update a memory index (e.g., page table) that identifies which portions of memory have been changed and are not yet synchronized with the secondary storage. In one example, the memory index may be updated to mark a portion of memory as read-only after the portion of memory is read. When the guest module attempts to modify the marked portion, a fault may be generated (e.g., page fault). In response to the fault, the guest module may mark the portion of physical memory as read-write to enable modification. The use of an intercept mechanism and faults during memory access (e.g., read or write) may be utilized by order indication module 214.

Order indication module 214 may track memory modifications and identify a temporal order that the modifications occurred. As discussed above, direct access memory module 212 may enable the guest module to bypass the host module when modifying physical memory. The host module may be responsible for synchronizing the changes that occur in physical memory with one or more secondary storages. The ability for the guest module to bypass the host module may make it challenging for the host module to monitor the order in which the memory was modified. The guest module may address this by using order indication module 214 to track the order of the direct access operations so that the order can be propagated to the host module. The order of the modifications may be useful to reduce or avoid data inconsistencies, data corruption, or other errors when synchronizing the physical memory to secondary storage.

Synchronization component 220 may communicate with memory modification component 210 and may include functionality for synchronizing the physical memory with the secondary storage. The synchronization may involve copying, saving, storing, replicating, mirroring, moving, migrating, or other action to update the secondary storage to reflect modifications to data in physical memory. In one example, the synchronization of physical memory may involve identifying portions of physical memory that have been modified but have not yet been saved to secondary storage. These portions of physical memory may be considered dirty memory portions (e.g., dirty pages, dirty blocks). The dirty memory portions may be synchronized with the secondary storage by saving the data in the dirty memory portions to the secondary storage. In one example, the synchronization may be a procedure that is the same or similar to a flush procedure or an update procedure that commits a portion of page cache to secondary storage.

Synchronization component 220 may ensure (e.g., guarantee) synchronization for some portions of memory without ensuring synchronization for other portions of memory. In one example, synchronization component 220 may ensure that all portions of memory that are modified (e.g., dirtied) before a synchronization request is issued, will be written to secondary storage. The portions of memory modified after the synchronization request is issued, may not be guaranteed to be written and therefore may or may not be written to secondary storage prior to receiving a subsequent synchronization request.

Synchronization component 220 may include one or more modules including a synchronous module 222, an asynchronous module 224, and a selection module 226. Each of the modules 222, 224, and 226 may correspond to a different technique for synchronizing the physical memory with secondary storage and may include features that are executed by host machine 120 via the guest module, the host module, other portion, or a combination thereof. In one example, order indication module 214 may store the order of the modifications in a time order data structure 242.

Time order data structure 242 may be a data structure that indicates a temporal order of memory modifications. The temporal order of memory modifications may be with respect to a synchronization request (e.g., flush hypercall). For example, the order of the modifications may identify one or more of the plurality of modifications that occurred before, after, or during the synchronization request being issued. Indicating an order with respect to issuance of the synchronization request may be beneficial because there may be a delay from when the guest module issues the synchronization request and when the host module receives and/or processes the synchronization request. The order enables the host module to distinguish modifications that occurred before the issuance of the synchronization request from the modifications that occurred after the issuance of the synchronization request. The temporal order of memory modifications may also or alternatively indicate an order between one or more of the plurality of modifications. This may enable the host module to determine that a first modification occurred prior to or after a second modification and that both the first and second modification occurred prior to the synchronization request being issued.

Time order data structure 242 may include a set, list, or other arrangement of identification information that indicates one or more memory modifications and the order in which the memory modifications occurred. The memory modifications may be identified based on memory locations or based on the direct access operation that caused the memory modification. In one example, time ordered data structure 242 may identify one or more portions of memory by providing identification information indicating the one or more memory locations of the physical memory. The memory locations may include logical locations, physical locations, or a combination thereof. The locations may be identified using any unit or range of units, such as addresses, blocks, sectors, regions, other units, or combination thereof. In another example, time ordered data structure 242 may identify the one or more direct access operations that caused the modifications and the direct access operations may be re executed (e.g., replayed) on the secondary storage or used by the host module to identify the modified memory locations.

Synchronous module 222 may synchronize the physical memory with the secondary storage using a synchronous technique. The synchronous technique may involve the guest module issuing a synchronization request to the underlying host module to perform memory synchronization and waiting for the host module to complete the synchronization before continuing. The synchronous technique may involve the guest module modifying the physical memory using one or more direct access operations. The guest module may then signal the host module to synchronize a portion of the physical memory. The signal may include identification information that indicates a portion of physical memory to synchronize. In one example, the identification information may correspond to the identification information of the guest module and may cause the host module to synchronize any or all data within the physical memory guest portion associated with the guest module. In another example, the identification information may identify a particular location of physical memory, such as a range of address, pages, blocks, other memory unit, or a combination thereof. In either example, the synchronous module may use time order data structure 242 to guarantee that data modified by the guest module is synchronized (e.g., copied, committed, written) to secondary storage before the synchronization request completes.

Asynchronous module 224 may synchronize the physical memory using an asynchronous technique that enables the guest module to continue executing other operations while the memory synchronization is occurring. The asynchronous technique may be similar to the synchronous technique discussed above, but may employ one or more barriers. A barrier may limit the portion of physical memory that is synchronized by the host module. This may enable a guest module to signal the host module to synchronize the physical memory but may limit how much of the physical memory is synchronized. A barrier may be implemented using a barrier marker 244, a lookup data structure 246, other data structure, or a combination thereof.

Barrier marker 244 may block the host module from synchronizing portions of physical memory that were modified after barrier marker 244. Barrier marker 244 may be any data or data structure that can be used to distinguish memory modifications that occurred before the barrier marker from memory modifications that occurred after the barrier marker. Barrier marker 244 may be inserted into a time ordered data structure 242 and may include one or more numeric values that distinguish the barrier marker from other barrier markers or portions of memory. In one example, as memory modifications occur the modified memory portions may be associated with one of a plurality of barrier markers 244. This may involve marking the memory portion or marking a data structure associated with the memory portion. When synchronization is initiated, the portions of physical memory associated with the oldest barrier marker 244 may be synchronized and memory portions associated with a more recent barrier may not be synchronized. In another example, memory portions and barrier marker 244 may both have identifiers along the same sequence (e.g., sequence identifiers). When synchronization is initiated, the portions of physical memory with identifiers before (e.g., lower than) the oldest barrier marker may by synchronized and memory portions with identifiers that are after (e.g., higher than) the oldest barrier may not be synchronized until receiving a subsequent synchronization signal.

Barrier marker 244 may be generated by the guest module, the host module, other program, or a combination thereof. In one example, the guest module may generate the barrier marker and add it to the time ordered data structure. In another example, the guest module may make a call to the host module and the host module may generate the barrier marker and either add it to the time ordered data structure 242 or return it so the guest module can add it to the time ordered data structure 242. In a simplified example, the host module may initiate a direct access operation to modify the physical memory and then initiate the generation of a first barrier marker. The host module may then initiate two more direct access operations followed by the initiation of a second barrier marker. The resulting time ordered data structure 242 may have five temporally ordered entries (modification_1; barrier marker_1; modification_2; barrier marker_2, modification_3). In other examples, there may be any number of modifications separated by any number of barrier markers.

Lookup data structure 246 may also or alternatively be used to implement barriers to memory synchronization. Lookup data structure 246 may comprise a data structure, such as a set, list, or other arrangement that includes data to identify the memory portions that can be synchronized in response to synchronization signal (e.g., fsync).

Selection module 226 may include a synchronization technique that is used in combination with or as an alternative to the synchronization technique discussed above. Selection module 226 may include functionality that enables a guest module to select particular portions of physical memory to be synchronized to secondary storage. For example, a guest module may select one or more portions of physical memory and indicate the selected portions to the host module. The portions may be identified by providing identification information indicating the one or more memory locations, which may be logical locations, physical locations, or a combination thereof. The locations may be identified using any unit or range of units, such as addresses, blocks, sectors, regions, other units, or combination thereof. In one example, a guest module may execute a hypercall to the host module that identifies the memory portions and initiates the host module to begin synchronizing the identified memory portions. The hypercall may be initiated by the host module or may be in response to a notification received from the host module, which will be discussed in more detail in regards to memory restriction component 230.

Memory restriction component 230 may include functionality for restricting modifications to physical memory. In one example, memory restriction component 230 may include a memory monitoring module 232, a notification module 234, and a permission module 236. Memory monitoring module 232 may monitor modifications to the physical memory made by one or more guest modules and may update one or more data structures (e.g., those discussed above) to identify portions of memory that have been modified. In one example, the memory monitoring module 232 may be executed by the host module and may track changes to the physical memory. In other examples, the memory monitoring module 232 may be executed by the guest module or a combination of the guest module and the host module.

Memory monitoring module 232 may also determine a quantity of memory that has been modified and can be synchronized to secondary storage (e.g., unsynchronized memory, dirty memory). The quantity may correspond to the amount of a shared buffer (e.g., page cache) being occupied by a guest module, a host module, or combination thereof. The quantity may correspond to an individual module (e.g., guest or host module), multiple modules (e.g., all guest modules), or a combination thereof. The quantity may be an aggregate value of modifications that indicates the number of modified memory pages or space occupied by the modified memory portions. The quantity may be based on a duration of time and may therefore indicate a rate of unsynchronized memory modifications performed by a particular individual guest module or group of guest modules (e.g., megabytes per second). The quantity determined by memory monitoring module 232 may be tracked and compared to threshold quantity data 248.

Threshold quantity data 248 may define one or more thresholds that limit the amount of memory portions (e.g., dirty pages) that a guest module or host module can occupy. In one example, a host module (e.g., hypervisor) may monitor the quantity of memory modifications made by a guest module and notify the guest module when the quantity exceeds the threshold. In another example, the guest module (e.g., guest OS) may monitor the quantity of memory modifications and limit itself in view of the threshold. These examples will be discussed in more detail in regards to notification module 234 and permission module 236 respectively.

Notification module 234 includes functionality to notify a guest module or host module when a quantity of unsynchronized memory exceeds a threshold quantity. Notification module 234 may be executed by the host module and may interact with memory monitoring module 232 to determine a quantity of unsynchronized memory. The quantity may include one or more quantities for a particular guest module, a group of guest modules, the host module or a combination thereof. Notification module 234 may compare the quantity(ies) of unsynchronized memory to the threshold to determine whether the guest module(s) should be restricted. In one example, restricting a guest module may involve temporarily preventing the guest module from modifying additional memory portions until at least some of the modifications are synchronized with the secondary storage. In another example, restricting a guest module may involve degrading the performance of the memory for the guest module(s), such as by altering memory prioritization or access times (e.g., read or write duration/latency).

Permission module 236 includes functionality that enables a guest module to query the host module to determine the threshold limit of unsynchronized memory permitted for the guest module. In one example, the guest module may be a guest operating system and the quantity may restrict the amount of a shared buffer that can be used by the virtual machine. The guest operating system may then monitor its own computing processes (e.g., user space and kernel processes) and restrict the amount of the shared buffer occupied by these computing processes to ensure that the guest operating system as a whole does not exceed the threshold limit of unsynchronized memory. When the guest operating system approaches the threshold it may signal to the host module to synchronize the modified memory.

Figure 3:
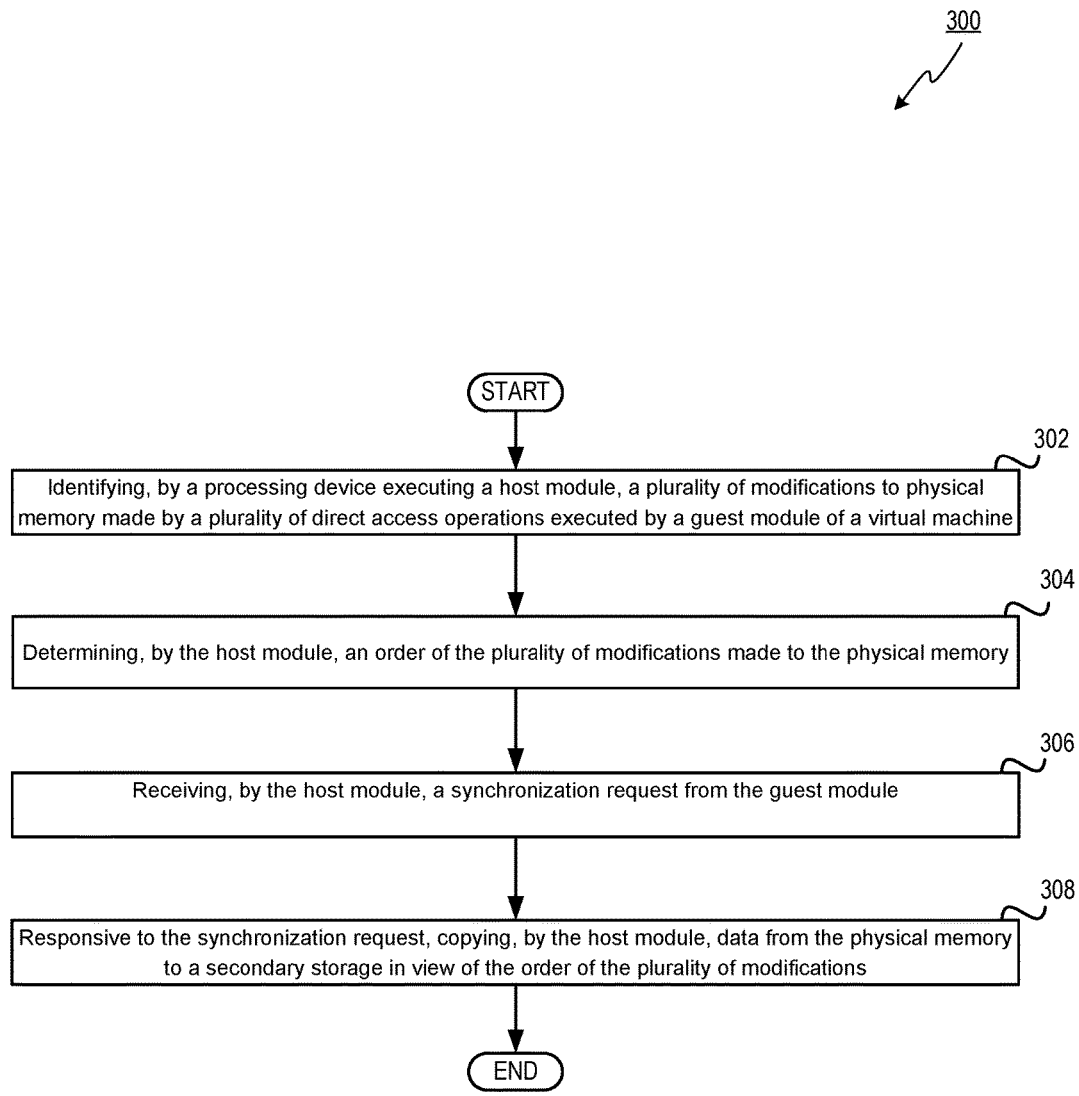
FIG. 3 depicts a flow diagram of a method executed by a host module (e.g., hypervisor) for synchronizing memory, in accordance with one or more aspects of the present disclosure.
Figure 4:
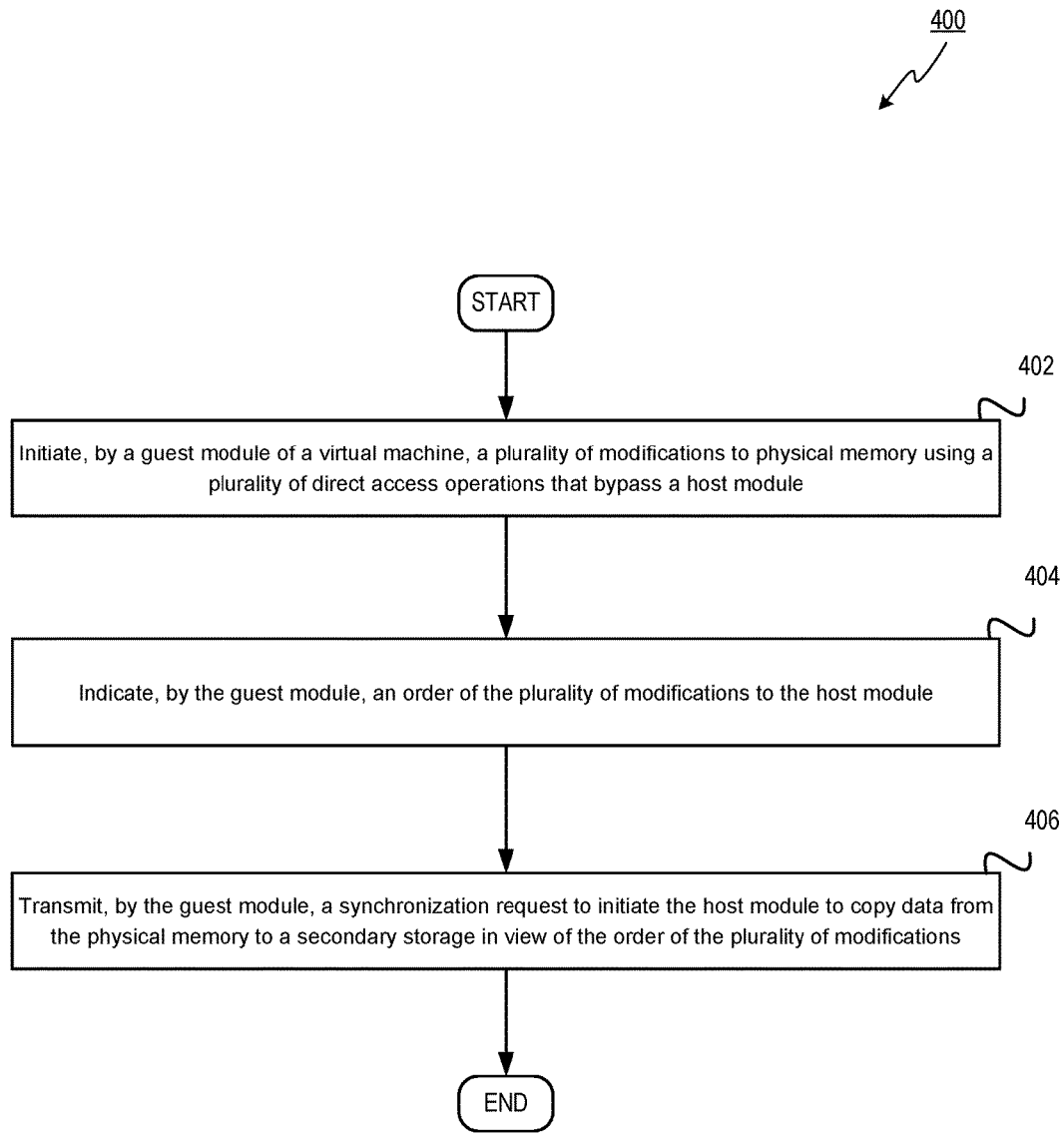
FIG. 4 depicts a flow diagram of a method executed by a guest module (e.g., guest operating system) for synchronizing memory, in accordance with one or more aspects of the present disclosure.

FIGS. 3 and 4 depict flow diagrams for illustrative examples of methods 300 and 400 for enabling a guest module of a virtual machine to indicate an order in which a host module should write data from memory to a secondary storage, in accordance with one or more aspects of the present disclosure. Method 300 includes steps that may be performed by a host module (e.g., hypervisor) and method 400 includes steps that may be performed by a guest module (e.g. guest operating system). Methods 300 and 400 may be performed by processing devices that may comprise hardware (e.g., circuitry, dedicated logic), computer readable instructions (e.g., run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by host machine 120, system 500, or system 600 as shown in FIGS. 1, 5, and 6 respectively.

Referring to FIG. 3, method 300 may be performed by processing devices of a host machine and may begin at block 302. At block 302, a processing device executing a host module may identify a plurality of modifications to physical memory made by a plurality of direct access operations executed by a guest module of a virtual machine. The guest module may be a guest operating system and the host module may be a hypervisor that provides a virtual machine to execute the guest operating system. The guest operating system may control an order in which the hypervisor writes data from the physical memory to the secondary storage. The direct access operations may enable the guest operating system to bypass the hypervisor and execute a load or store instruction for the physical memory. The physical memory may comprises non-volatile direct access memory or emulated non-volatile direct access memory that enables a user space process running on the guest operating system to bypass a kernel of the guest operating system when modifying the non-volatile direct access memory. The host module may support multiple guest operating systems that perform modifications to a file system residing in the physical memory. The modifications may be stored in a shared page cache provided by the host module without being stored in a page cache of any of the guest operating systems. In one example, each of the guest modules may be free of (e.g., absent or without) an individual page cache. The plurality of direct access operations executed by the guest module may include file system operations that modify a file system that completely resides in the physical memory (e.g., within the guest portion of the physical memory or within a combination of the guest portion and the shared portion of physical memory).

At block 304, the processing device executing the host module may determine an order of the plurality of modifications made to the physical memory. The order of memory modifications may be with respect to a synchronization request (e.g., flush hypercall). For example, the order of the modifications may identify one or more of the plurality of modifications that occurred before, after, or during the synchronization request being issued. The order enables the host module to distinguish modifications that occurred before issuance of the synchronization request from those that occurred after issuance of the synchronization request. The order of memory modifications may also or alternatively indicate an order between one or more of the plurality of modifications so that the host module can identify that a first modification occurred prior to or after a second modification and that both the first and second modification occurred prior to the synchronization request being issued. Determining the order of the plurality of modifications may involve receiving a data structure comprising an order of the modifications from the guest module. The data structure may include a memory barrier (e.g., barrier marker 244) that permits a first modification that occurred before the memory barrier to be synchronized to secondary storage and limits a second modification that occurred after the memory barrier from being synchronized to the secondary storage. In one example, the order of the plurality of modifications is used by the host module or guest module to generate a snapshot of the memory occupied by the guest module.

At block 306, the processing device executing the host module may receive a synchronization request from the guest module. The synchronization request may comprise a flush hypercall specifying a memory address to be copied by the host module to the secondary storage. In one example, the guest module synchronously initiates the synchronization request and waits for a synchronization procedure (e.g., data copying) to complete. In another example, the guest module asynchronously initiates the synchronization request without waiting for a synchronization procedure to complete.

At block 308, the processing device executing the host module may, in response to the synchronization request, copy data from the physical memory to a secondary storage in view of the order of the plurality of modifications. The host module may refrain (e.g., wait) from performing the copying of data from the physical memory to the secondary storage until receiving the synchronization request from the guest module. Copying the data may involve the host module copying data that is associated with the guest module that initiated the synchronization request. Responsive to completing the operations described herein above with references to block 308, the method may terminate.

In other examples of method 300 or 400, the processing device of the host machine may monitor a quantity of unsynchronized physical memory. The unsynchronized physical memory may include a portion of the physical memory that is modified by the guest module and not synchronized with the secondary storage. The quantity of unsynchronized physical memory corresponds to a quantity of dirty memory pages in a shared page cache managed by the host module. In one example, the threshold quantity may be in view of the quantity of dirty memory pages associated with a particular guest module. In another example, the threshold quantity may be in view of the quantity of dirty memory pages associated with all guest modules hosted by the host module. The method may further involve permitting the guest module to continue modifying the physical memory when the quantity is within a threshold quantity. In response to the quantity of unsynchronized physical memory exceeding a threshold, the host module may notify the guest module that additional modifications to the physical memory are restricted.

Referring to FIG. 4, method 400 may be the same or similar to method 300 and may be executed by a guest module as opposed to a host module. Method 400 may be performed by processing devices of a host machine and may begin at block 402. At block 402, a processing device executing a guest module of a virtual machine may initiate a plurality of modifications to physical memory using a plurality of direct access operations that bypass a host module. The direct access operations may enable the guest operating system to bypass the hypervisor and execute a load or store instruction for the physical memory. The physical memory may comprises non-volatile direct access memory or emulated non-volatile direct access memory that enables a user space process running on the guest module (e.g., guest operating system) to bypass a kernel of the guest module when modifying the non-volatile direct access memory.

At block 404, may be the same or similar to block 304 and may involve a processing device executing the guest module to indicate an order of the plurality of modifications to the host module. Indicating the order of the plurality of modifications may involve transmitting a data structure comprising an order of data modification of the guest module. The data structure may include a memory barrier that permits a first data modification to be synchronized to secondary storage and limits a second data modification from being synchronized to the secondary storage.

At block 406, a processing device executing a guest module may transmit a synchronization request to initiate the host module to copy data from the physical memory to a secondary storage in view of the order of the plurality of modifications. The synchronization request may comprise a flush hypercall specifying a memory address to be copied by the host module to the secondary storage. In one example, the guest module synchronously initiates the synchronization request and waits for a synchronization procedure to complete. In another example, the guest module asynchronously initiates the synchronization request without waiting for a synchronization procedure to complete. Responsive to completing the operations described herein above with references to block 406, the method may terminate.

Figure 5:
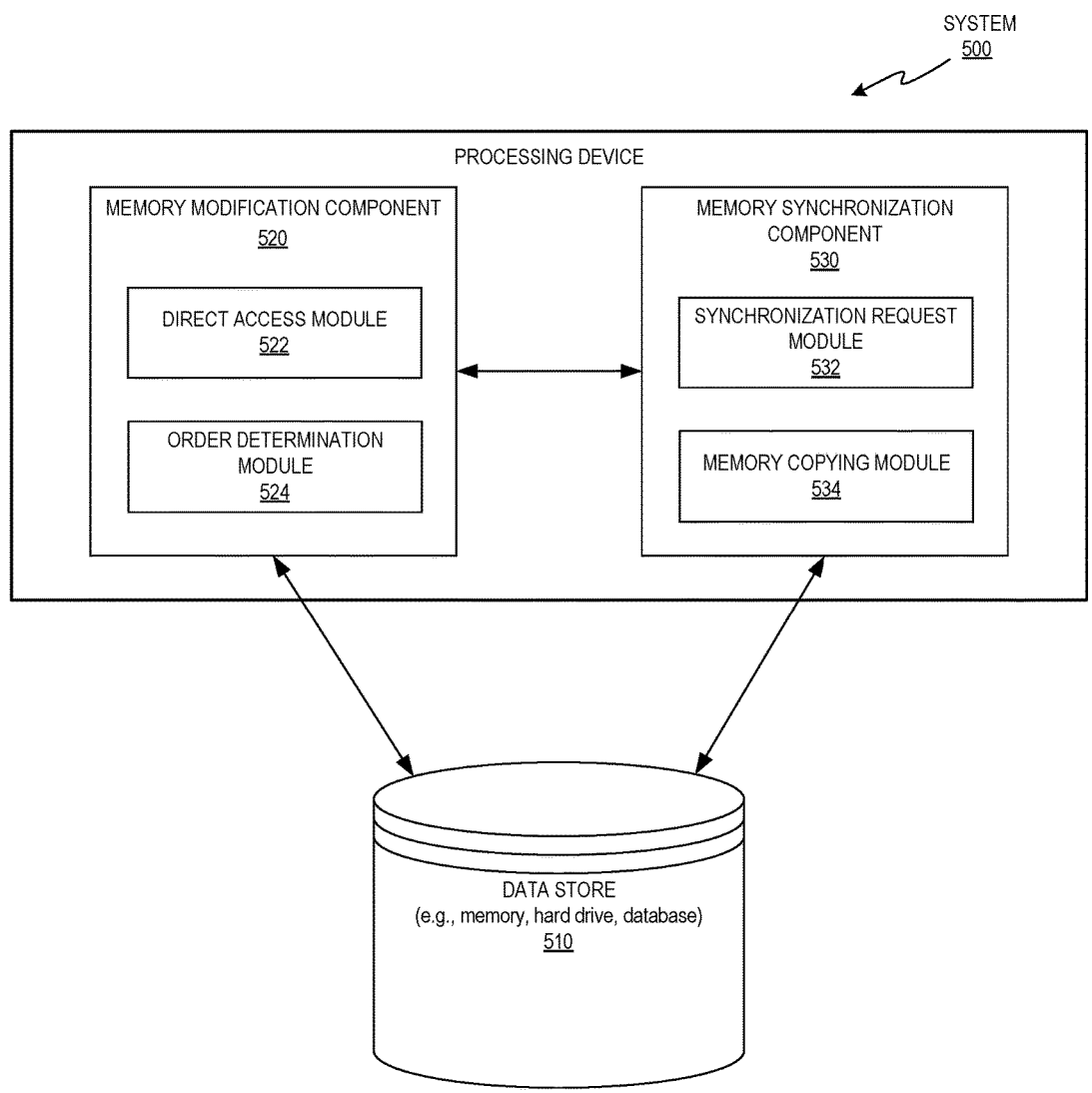
FIG. 5 schematically illustrates an example system, in accordance with one or more aspects of the present disclosure.

FIG. 5 illustrates an example system 500 in which implementations of the disclosure may operate. System 500 may include a data store 510, a memory modification component 520, and a memory synchronization component 530. Data store 510 may be any non-persistent data storage (e.g., memory) or persistent data store (e.g., hard disk, database). Memory modification component 520 may include direct access module 512 and order determination module 514. Memory synchronization component 530 may include synchronization request module 532 and memory copying module 534.

Direct access module 522 may enable a host module to identify a plurality of modifications to physical memory made by a plurality of direct access operations executed by a guest module. The guest module may comprise a guest operating system of a virtual machine and the host module may comprise a hypervisor managing the virtual machine. The guest operating system may control an order the hypervisor writes data from the physical memory to the secondary storage. The direct access operations may enable the guest operating system to bypass the hypervisor and execute a load or store instruction for the physical memory. The physical memory may comprises non-volatile direct access memory or emulated non-volatile direct access memory and a user space process running on the guest operating system may bypass a kernel of the guest operating system when modifying the non-volatile direct access memory. In one example, the host module may support multiple guest operating systems that perform modifications to a file system residing in the physical memory, wherein the modifications are stored in a shared page cache provided by the host module without being stored in a page cache of any of the guest operating systems, wherein each of the guest modules is free/absent/without of page cache. The plurality of direct access operations executed by the guest module comprise file system operations that modify a file system that completely resides in physical memory.

Order determination module 524 may determine an order of the plurality of direct access operations. Determining the order of the plurality of direct access operations may involve receiving a data structure comprising an order of data modification from the guest module. The data structure may specify a memory barrier that permits a first data modification to be synchronized to secondary storage and limits a second data modification from being synchronized to the secondary storage. In one example, the order of the plurality of modifications is used to generate a snapshot of the memory occupied by the guest module.

Synchronization component 532 may enable the host module to receive a synchronization request from the guest module. The synchronization request may comprise a flush hypercall specifying a memory address to be copied by the host module to the secondary storage. In one example, the guest module synchronously initiates the synchronization request and waits for a synchronization procedure to complete. In another example, the guest module asynchronously initiates the synchronization request without waiting for a synchronization procedure to complete.

Memory copying module 534 may enable the host module to, in response to the synchronization request, copy data from the physical memory to a secondary storage in view of the order of the plurality of modifications to physical memory. The host module may refrain from performing the copying of data from the physical memory to the secondary storage until receiving the synchronization request from the guest module. Copying the data may involve the host module copying data that is associated with the guest module that initiated the synchronization request.

Figure 6:
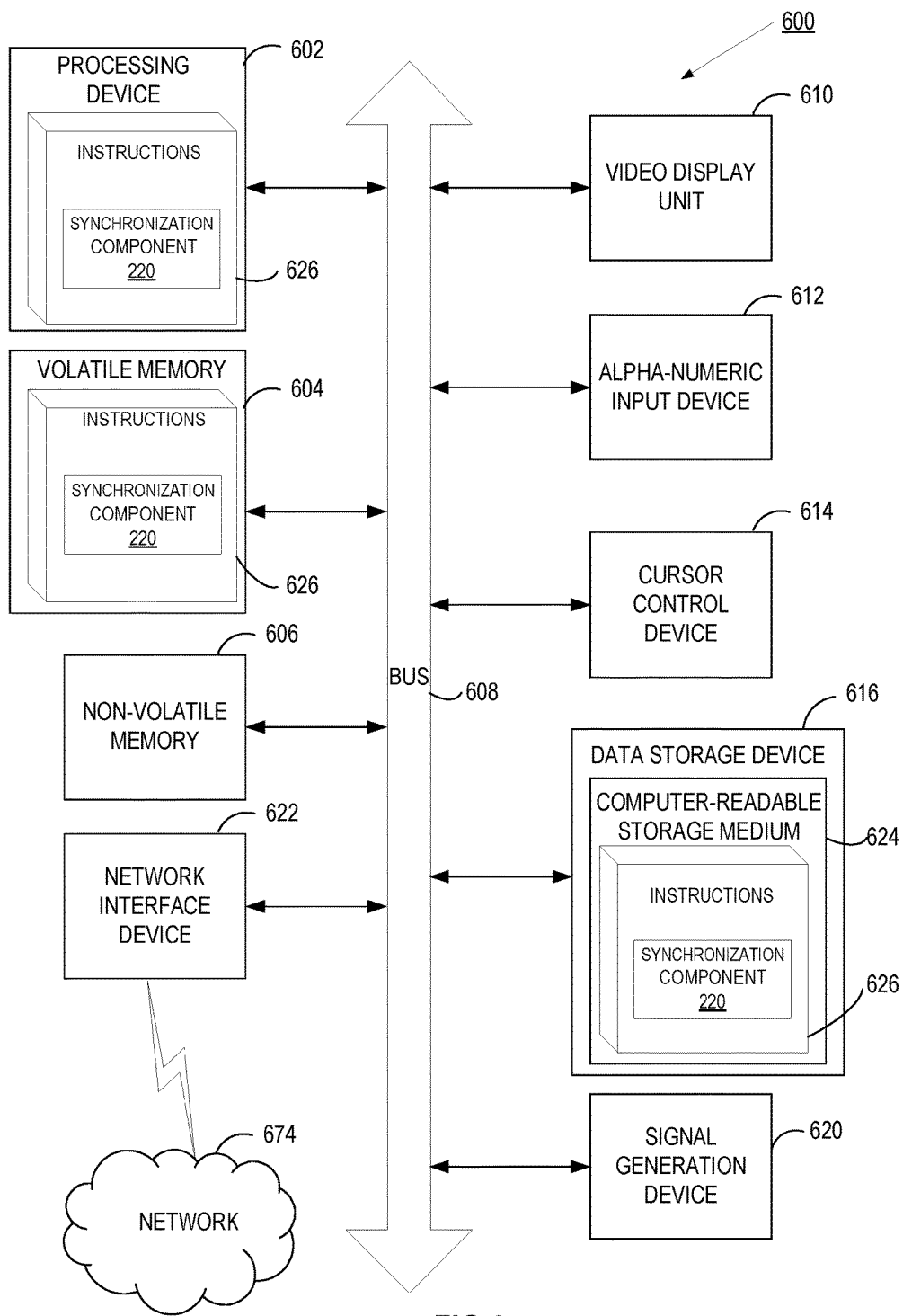
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to host machine 120 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions encoding order indication module 214 and synchronization component 220 of FIG. 2 for implementing methods 300 or 400.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "detecting," "initiating," "marking," "generating," "confirming," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   identifying, by a processing device executing a host kernel, a plurality of modifications to physical memory made by a plurality of direct access operations, wherein the direct access operations are executed by a guest operating system and bypass the host kernel;
   receiving, by the host kernel, information from the guest operating system indicating an order of the plurality of modifications made to the physical memory;
   receiving, by the host kernel, a synchronization request from the guest operating system; and
   responsive to the synchronization request, copying, by the host kernel, data from the physical memory to a secondary storage in view of the order of the plurality of modifications.

2. The method of claim 1, wherein the guest operating system comprises a guest kernel executing on a virtual machine and the host kernel comprises a hypervisor managing the virtual machine.

3. The method of claim 2, wherein the plurality of direct access operations enable the guest operating system to bypass the hypervisor and execute a load instruction of the physical memory.

4. The method of claim 1, wherein the physical memory comprises non-volatile direct access memory, and wherein a user space process running on the guest operating system is to bypass a kernel of the guest operating system and to modify the non-volatile direct access memory.

5. The method of claim 1, wherein the host kernel is to refrain from performing the copying of the physical memory to the secondary storage until receiving the synchronization request from the guest operating system.

6. The method of claim 1, wherein the host kernel supports multiple guest operating systems that perform modifications to a file system residing in the physical memory, wherein the modifications are stored in a shared page cache provided by the host kernel without being stored in a page cache of any of the guest operating systems.

7. The method of claim 1, further comprising:
   monitoring, by the host kernel, a quantity of unsynchronized physical memory, wherein the unsynchronized physical memory comprises data that is modified by the guest operating system and is not synchronized with the secondary storage; and
   permitting the guest operating system to continue modifying the physical memory when the quantity is within a threshold quantity.

8. The method of claim 7, further comprising: in response to the quantity of unsynchronized physical memory exceeding a threshold, notifying the guest operating system that additional modifications to the physical memory are restricted.

9. The method of claim 7, wherein the threshold quantity is in view of a quantity of dirty memory pages associated with a particular guest operating system or all guest operating systems hosted by the host kernel.

10. The method of claim 1, wherein the order of the plurality of modifications indicates an order with respect to the synchronization request and identifies one or more of the plurality of modifications that occurred prior to the synchronization request being issued.

11. The method of claim 10, wherein the order of the plurality of modifications further indicates an order between one or more of the plurality of modifications that occurred prior to the synchronization request being issued.

12. The method of claim 1, wherein determining the order of the plurality of modifications, comprises receiving, from the guest operating system, a data structure comprising information indicating the order.

13. The method of claim 12, wherein the data structure specifies a memory barrier that permits a first modification that occurred before the memory barrier to be synchronized to secondary storage and limits a second modification that occurred after the memory barrier from being synchronized to the secondary storage.

14. The method of claim 1, wherein the order of the plurality of modifications to physical memory is used to generate a snapshot of the memory occupied by the guest operating system.

15. A system comprising:
   a memory; and
   a processing device operatively coupled to the memory, the processing device to:
      identify, using a host kernel, a plurality of modifications to physical memory made by a plurality of direct access operations, wherein the direct access operations are executed by a guest operating system and bypass a kernel of the host kernel;
      receive, using the host kernel, information from the guest operating system indicating an order of the plurality of modifications made to the physical memory;
      receive, using the host kernel, a synchronization request from the guest operating system; and
      responsive to the synchronization request, copy, by the host kernel, data from the physical memory to a secondary storage in view of the order of the plurality of modifications.

16. The system of claim 15, wherein the guest operating system comprises a guest kernel executing on a virtual machine and the host kernel comprises a hypervisor managing the virtual machine.

17. The system of claim 16, wherein the plurality of direct access operations enable the guest operating system to bypass the hypervisor and execute a load instruction of the physical memory.

18. A non-transitory machine-readable storage medium storing instructions that cause a processing device to:
   initiate, by a guest operating system of a virtual machine, a plurality of modifications to physical memory using a plurality of direct access operations, wherein the direct access operations bypass a host kernel;

provide, by the guest operating system, information to the host kernel indicating an order of the plurality of modifications; and transmit, by the guest operating system, a synchronization request to initiate the host kernel to copy data from the physical memory to a secondary storage in view of the order of the plurality of modifications.

19. The non-transitory machine-readable storage medium of claim 18, wherein the guest operating system synchronously initiates the synchronization request and waits for the host kernel to copy the data from the physical memory to the secondary storage.

20. The non-transitory machine-readable storage medium of claim 18, wherein the guest operating system asynchronously initiates the synchronization request without waiting for the host kernel to copy the data from the physical memory to the secondary storage.

* * * * *